(12) United States Patent
Sumpter et al.

(10) Patent No.: US 11,888,873 B2
(45) Date of Patent: *Jan. 30, 2024

(54) ATTACK SURFACE IDENTIFICATION

(71) Applicant: ZeroFOX, Inc., Baltimore, MD (US)

(72) Inventors: Jason Emile Sumpter, Abingdon, MD (US); James Christopher Foster, Baltimore, MD (US); Michael Morgan Price, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,928

(22) Filed: Oct. 24, 2022

(65) Prior Publication Data

US 2023/0106575 A1    Apr. 6, 2023

Related U.S. Application Data

(63) Continuation of application No. 17/491,989, filed on Oct. 1, 2021, now Pat. No. 11,516,232.

(51) Int. Cl.
*H04L 9/40* (2022.01)
*G06F 16/955* (2019.01)

(52) U.S. Cl.
CPC ...... *H04L 63/1416* (2013.01); *G06F 16/9566* (2019.01); *H04L 63/20* (2013.01)

(58) Field of Classification Search
CPC . H04L 63/1416; H04L 63/1433; H04L 63/20; G06F 16/9566; G06F 16/958; G06F 16/972

See application file for complete search history.

(56) References Cited

U.S. PATENT DOCUMENTS

| | | | |
|---|---|---|---|
| 9,641,434 B1 | 5/2017 | Laurence et al. | |
| 10,043,004 B2 | 8/2018 | Cornell et al. | |
| 10,182,068 B2 * | 1/2019 | Munoz | G06F 21/552 |
| 10,185,761 B2 | 1/2019 | Mahjoub et al. | |
| 10,210,335 B2 * | 2/2019 | Madou | G06F 21/577 |
| 10,447,709 B2 * | 10/2019 | Giakouminakis | G06F 21/577 |
| 10,515,219 B2 * | 12/2019 | Sechman | G06F 11/3672 |
| 10,592,938 B2 | 3/2020 | Hogg et al. | |
| 11,516,232 B1 * | 11/2022 | Sumpter | G06F 16/9566 |
| 11,568,455 B2 * | 1/2023 | Hogg | G06Q 30/0641 |
| 2012/0124372 A1 | 5/2012 | Dilley et al. | |
| 2018/0115595 A1 | 4/2018 | Krishnan et al. | |
| 2020/0210511 A1 | 7/2020 | Korobov et al. | |

* cited by examiner

*Primary Examiner* — Hosuk Song
(74) *Attorney, Agent, or Firm* — DLA PIPER LLP (US)

(57) ABSTRACT

Systems and methods are provided to generate an attack surface for a protected entity. The method an include receiving identifying information associated with the protected entity; scanning one or more third parties to identify a host associated with the protected entity; determining that the host resolves to a webpage; resolving the webpage; extracting a uniform resource locator (URL) from the resolved webpage; determining, based on at least one rule, that the URL is associated with the protected entity; and generating the attack surface for the protected entity, the attack surface comprising the URL.

10 Claims, 11 Drawing Sheets

ATTACK SURFACE IDENTIFICATION

CROSS-REFERENCE TO RELATED APPLICATIONS

This is a continuation of U.S. application Ser. No. 17/491,989, filed Oct. 1, 2021, which is herein incorporated by reference in its entirety.

BACKGROUND OF THE DISCLOSURE

A typical first step for cybersecurity protection processes on behalf of an entity is to perform inventory of the entity's assets that need to be protected. An entity's assets serve as potential points susceptible to cyberattacks, such as by entering data to or extracting data from an environment. Therefore, entities are incentivized to inform cybersecurity platforms of their assets so that sufficient protection is possible. This can be referred to as defining the entity's "attack surface" or "digital footprint." Current cybersecurity platforms typically either perform asset discovery to discover technical assets, such as servers, routers, etc. or they protect personnel-based assets, such as social media accounts. In addition, many entities are encouraged to minimize an attack surface as a basic security measure.

SUMMARY OF THE DISCLOSURE

According to one aspect of the present disclosure, a method for generating an attack surface for a protected entity can include receiving identifying information associated with the protected entity; scanning one or more third parties to identify a host associated with the protected entity; determining that the host resolves to a webpage; resolving the webpage; extracting a uniform resource locator (URL) from the resolved webpage; determining, based on at least one rule, that the URL is associated with the protected entity; and generating the attack surface for the protected entity, the attack surface comprising the URL.

In some embodiments, extracting the URL can include crawling the resolved webpage. In some embodiments, extracting the URL can include scraping the resolved webpage. In some embodiments, determining, based on the at least one rule, that the URL is associated with the protected entity can include determining that the URL is associated with at least one social network. In some embodiments, the method can include identifying an identity associated with the at least one social network; comparing the identity to an employee list associated with the protected entity; determining that the identity is an employee of the protected entity; and modifying the attack surface for the protected entity to include at least one social media account associated with the identity. In some embodiments, the method can include determining that a social media account from the URL is associated with the protected entity; and modifying the attack surface for the protected entity to include the social media account. In some embodiments, determining, based on the at least one rule, that the URL is associated with the protected entity can include determining that the URL is associated with GitHub.

According to another aspect of the present disclosure, a non-transitory computer-readable medium can have instructions stored thereon for execution by a server to implement a method for generating an attack surface for a protected entity. The method can include receiving identifying information associated with the protected entity; scanning one or more third parties to identify a host associated with the protected entity; determining that the host resolves to a webpage; resolving the webpage; extracting a uniform resource locators (URLs) from the resolved webpage; determining, based on at least one rule, that the URL is associated with the protected entity; and generating the attack surface for the protected entity, the attack surface comprising the URL.

In some embodiments, extracting the URL can include crawling the resolved webpage. In some embodiments, extracting the URL can include scraping the resolved webpage. In some embodiments, determining, based on the at least one rule, that the URL is associated with the protected entity can include determining that the URL is associated with at least one social network.

In some embodiments, the method can further include identifying an identity associated with the at least one social network; comparing the identity to an employee list associated with the protected entity; determining that the identity is an employee of the protected entity; and modifying the attack surface for the protected entity to include at least one social media account associated with the identity. In some embodiments, the method can further include determining that a social media account from the URL is associated with the protected entity; and modifying the attack surface for the protected entity to include the social media account. In some embodiments, determining, based on the at least one rule, that the URL is associated with the protected entity comprises determining that the URL is associated with GitHub.

According to another aspect of the present disclosure, method for generating an attack surface for a protected entity can include scanning a Border Gateway Protocol (BGP); identifying, as a result of the scanning, at least one Autonomous System (AS) associated with the protected entity; analyzing the at least one AS to identify one or more Internet Protocol (IP) prefixes and a first set of IP addresses associated with the protected entity; obtaining owner information for the one or more IP addresses; performing a lookup to identify at least one domain name associated with the owner information; and generating the attack surface for the protected entity, the attack surface comprising the first set of IP addresses and the at least one domain name.

In some embodiments, the method can include performing, via a security service, a pivot on the at least one domain name to identify at least one of a subdomain and a second set of IP addresses; and modifying the attack surface for the protected entity to comprise the at least one of the subdomain and the second set of IP addresses. In some embodiments, the method can include evaluating at least one of the at least one domain name and the first set of IP addresses to confirm association with the protected entity. In some embodiments, evaluating an IP address of the first set of IP addresses can include obtaining Whois information for the IP address; and comparing the Whois to the identifying information associated with the protected entity.

According to another aspect of the present disclosure, a method for managing an attack surface for a protected entity can include receiving identifying information associated with the protected entity from a client device; receiving physical asset information for one or more physical assets associated with the protected entity from the client device; scanning one or more networks to discover one or more network assets associated with the protected entity; scanning one or more networks to discover one or more personnel-based assets associated with the protected entity; generating the attack surface for the protected entity, the attack surface comprising the one or more physical assets, the one or more network assets, and the one or more personnel-based assets;

and causing an asset report to be display on the client device, the asset report comprising a selectable visualization of the one or more physical assets, the one or more network assets, and the one or more personnel-based assets.

In some embodiments, the method can include receiving a selection of one of a physical asset, a network asset, or a personnel-based asset; and in response to the selection, causing information on the selected asset to be displayed on the client device. In some embodiments, the method can include receiving a selection of a download selector; and causing the selectable visualization to be downloaded onto the client device. In some embodiments, the method can further include causing a list of the one or more physical assets, the one or more network assets, and the one or more personnel-based assets to be displayed, wherein each entry comprises an associated status indicator. In some embodiments, the method can include causing a risk level to be displayed on the client device for at least one of the one or more network assets, the one or more physical assets, or the one or more personnel-based assets; and causing an overall risk level for the protected entity to be displayed on the client device. In some embodiments, the method can include causing an asset breakdown diagram to be displayed on the client device, the asset breakdown diagram illustrating proportions of assets that fall within one or more asset classes.

DESCRIPTION

The following detailed description is merely exemplary in nature and is not intended to limit the invention or the applications of its use.

In current times, many entities actually have an extensive sprawl on the Internet, which can create significant vulnerability issues for both the entity and cybersecurity companies employed to offer protection services. Because of the extensive sprawl of potential points and vectors in which an entity is open to cyberattacks, it has become quite common for assets to be missed when reporting to chief information security officers (CISOs) and cybersecurity companies alike.

Thus, embodiments of the present disclosure relate to systems and methods for attack surface identification. The disclosed systems and methods serve to find and correspond assets on behalf of an entity. This includes both technical or physical assets (e.g., servers, devices, routers, repositories, etc.) and personnel-based assets (occasionally referred to as digital assets), such as social media accounts, people, and the like. The disclosed system can, based on information identifying an entity, utilize high-level tactics to scan and analyze wide swaths of the internet to attribute portions of the internet to the entity, such as cyberblocks, Internet Protocol (IP) prefixes, hosts, etc., which can be referred to as network assets herein. Then, the disclosed system can drill down with lower level tactics to identify various other assets, such as IP addresses, domains, subdomains, etc. In addition, the disclosed system can analyze, via techniques such as web crawling, these assets to determine personnel-based assets. For example, the system can identify social media accounts, executives, locations, and the like that are associated with the entity. By compiling all of these assets, the disclosed embodiments can thus generate a more robust attack surface for an entity, allowing for more effective monitoring and protection of the entity. In some embodiments, the disclosed principles can also discover third party assets associated with a protected entity, such as a service that is used by the entity and various other indirect assets.

Figure 1:
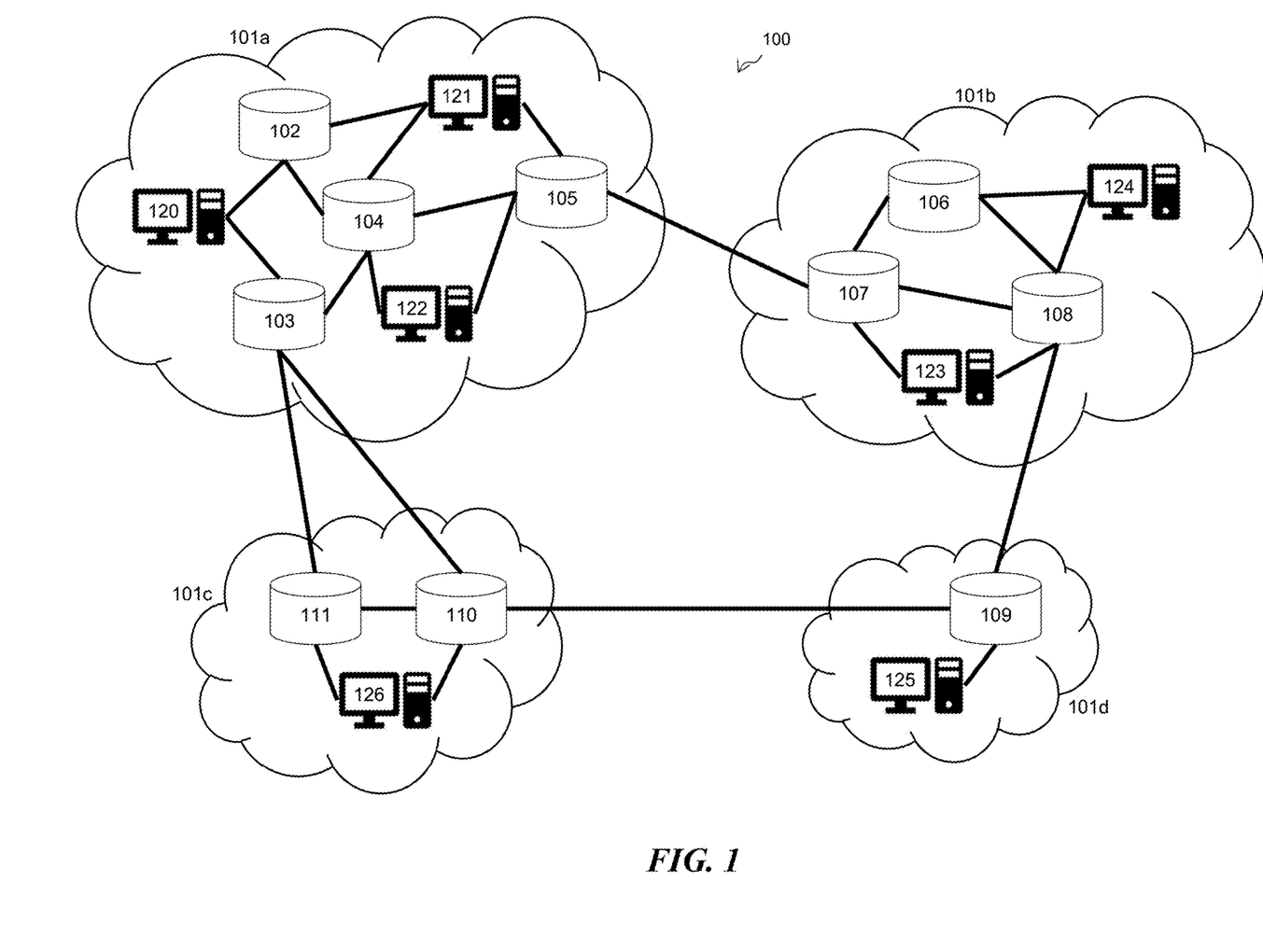
FIG. 1 shows an example diagram of an Internet architecture.

FIG. 1 shows an example diagram of an Internet architecture 100. The Internet architecture 100 includes a plurality of Autonomous Systems (AS's) 101a-101d (generally referred to herein as an "AS 101" or collectively referred to herein as "AS's 101"). AS's are generally understood to be sets of Internet routable IP prefixes that belong to a network or a collection of networks. These IP prefixes are typically managed, supervised, and controlled by a single entity or organization, such as a company, school, hospital, etc. Additionally, AS's are generally assigned identifying numbers, referred to herein as Autonomous System Numbers (ASNs), which can be a globally unique 16-digit identification number. Although FIG. 1 only shows four AS's, the embodiments described herein are not limited by this number and typically will involve larger swaths of the Internet, which can include any number of AS's. As shown in FIG. 1, each AS 101 includes one or more routers and one or more devices. For example, AS 101a includes routers 102-105 and devices 120-122; AS 101b includes routers 106-108 and devices 123-124; AS 101c includes routers 110-111 and a device 126; and AS 101d includes a router 109 and a device 125. In some embodiments, one or more of the routers 102-111 may be Border Gateway Protocol (BGP) routers. The BGP protocol manages the routing of packets between devices and routers of different AS's across the Internet based on their respective ASN's.

Figure 2:
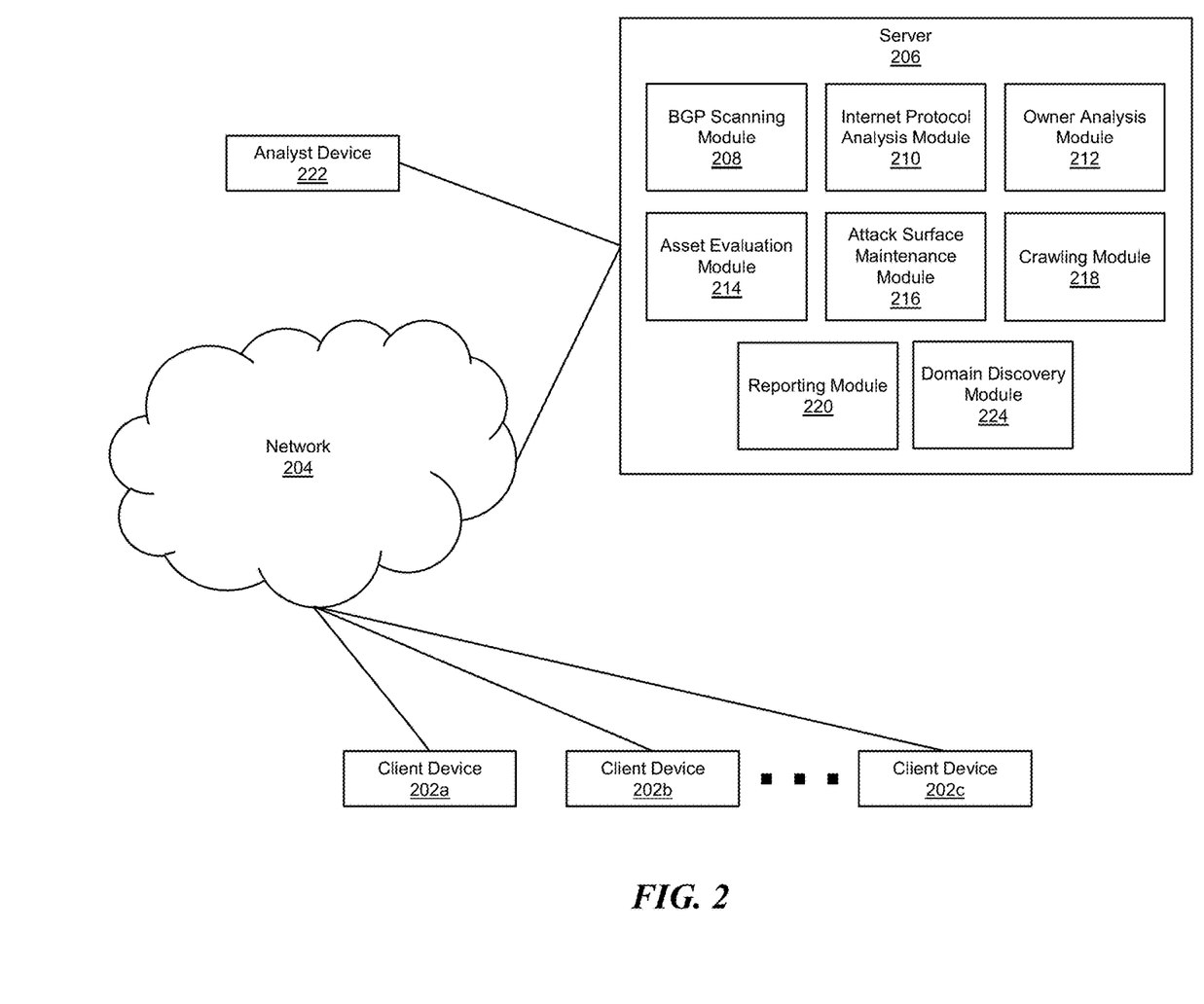
FIG. 2 is a block diagram of an example system for generating an attack surface, according to some embodiments of the present disclosure.

FIG. 2 is a block diagram of an example system 200 for generating an attack surface, according to some embodiments of the present disclosure. The system 200 can include a plurality of client devices 202a-n (generally referred to herein as a "client device 202" or collectively referred to herein as "client devices 202"), an analyst devices 222, and a server 206, which are communicably coupled via a network 204. In some embodiments, system 200 may include various additional analyst devices and is not limited to one. In some embodiments, the client devices 202 are associated with a single entity, such as a company or other organization. In this case, server 206 is configured to receive various information about the entity from one or more of the client devices 202, such as entity identifying information, including employee names, images, social media accounts and pages, locations, IP addresses, hostnames, domains, remote work accounts (e.g., Zoom, WebEx, etc.). In addition, server 206 can be configured to perform attack surface generation techniques on behalf of the entity. In some embodiments, analyst device 222 and server 206 may be communicably coupled to various numbers of devices on behalf of various separate entities and may perform attack surface generation techniques for each of the managed entities.

Client devices 202 and/or an analyst device 222 can include one or more computing devices capable of receiving user input, transmitting and/or receiving data via the network 204, and or communicating with the server 206. In some embodiments, client device 202 and/or an analyst device 222 can be representative of a computer system, such as a desktop or laptop computer. Alternatively, client device 202 and/or an analyst device 222 can be a device having computer functionality, such as a personal digital assistant (PDA), a mobile telephone, a smartphone, or other suitable device. In some embodiments, client device 202 and/or an analyst device 222 can be the same as or similar to the device 500 described below with respect to FIG. 5. In some embodiments, a client device 202 can also include networking devices such as routers.

The network 204 can include one or more wide areas networks (WANs), metropolitan area networks (MANs), local area networks (LANs), personal area networks (PANs), or any combination of these networks. The network 204 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 204 can also use standard communication technologies and/or protocols.

Server device 206 may include any combination of one or more of web servers, mainframe computers, general-purpose computers, personal computers, or other types of computing devices. Server device 206 may represent distributed servers that are remotely located and communicate over a communications network, or over a dedicated network such as a local area network (LAN). Server device 206 may also include one or more back-end servers for carrying out one or more aspects of the present disclosure. In some embodiments, server device 206 may be the same as or similar to server device 600 described below in the context of FIG. 6. In some embodiments, server 206 can include a primary server and multiple nested secondary servers for additional deployments of server 206. In some embodiments, server 206 may be a centralized grouping of one or more servers to monitor multiple environments on behalf of one or more clients. In other embodiments, the system 200 may utilize an edge computing topology, wherein server 206 (or a group of one or more servers) resides at a location close to, the same as, or associated with the entity. Such a framework brings computation and data storage closer to a client's or monitored entity's physical location, improving response times and conserving bandwidth.

As shown in FIG. 2, server 206 includes various modules 208-220, such as a BGP scanning module 208, an IP analysis module 210, an owner analysis module 212, an asset evaluation module 214, an attack surface maintenance module 216, a crawling module 218, and a reporting module 220.

BGP scanning module 208 is configured to scan and analyze BGP routings of the Internet to discover AS's and/or ASN's that may be related to a protected entity. The BGP scanning module 208 can be configured to utilize various techniques and tools such as Hurricane Electric BGP Toolkit and other BGP searching tools. In some embodiments, these tools may be open source.

IP analysis module 210 is configured to receive lists or entries of potentially relevant ASN's. Then, IP analysis module 210 can search and pull down ASN's and find IP prefixes and IP addresses associated with an ASN that has at least one matching criteria to the protected entity. In some embodiments, the matching criteria can include various identifying information, such as names of employees or owners, company names, addresses, phone numbers, etc. In some embodiments, a set of IP prefixes (i.e., a cyberblock, netblock, etc.) can be identified. In some embodiments, an analyst can leverage an ASN description or IP prefix to determine correlation to an organization, as the prefix is typically announced.

Owner analysis module 212 is configured to obtain owner information for IP addresses, such as the ones identified by the IP analysis module 210, as described above. For example, owner analysis module 212 can utilize Arin Whois Queries on the owner of the IP addresses, the company, etc., which often returns additional things owned by the same owner.

Asset evaluation module 214 is configured to evaluate various identified assets to confirm relation to the protected entity. In some embodiments, this can include resolving webpages, confirming employee names, confirming locations, etc. In some embodiments, asset evaluation module 214 can query analysts (e.g., via analyst device 222) to confirm that identified assets are related to a specific entity.

Attack surface maintenance module 216 is configured to generate and manage attack surfaces on behalf of entities. For example, attack surface maintenance module 216 is configured to manage and consistently update the attack surface for an entity by receiving assets confirmed to be related to the entity from asset evaluation module 214 and adding to a master list, which may be stored in the database. Such a master list can also be used by additional groups or organizations to monitor and protect all the assets of an entity.

Crawling module 218 is configured to employ various crawling tools, such as a Web crawler, to "crawl" through a website (e.g., a host identified as being associated with the protected entity) and identify personnel-based assets, such as social media accounts, executives, locations, VIPs, etc. Crawling module 218 can also be configured to pass identified personnel-based assets to the asset evaluation module 214 for evaluation and confirmation.

Reporting module 220 is configured to generate visualizations and graphs of an entity's attack surface generated according to the embodiments described herein. For example, the graph can be an interactive visualization that is displayed on a client device 202 associated with the entity. In some embodiments, the visualization may also be displayed to an analyst on analyst device 222. In terms of interactivity, a user (either an analyst at analyst device 222 or a client associated with the entity at client device 202) may be able to pivot around the various assets of the attack surface and select individual assets to view. For example, a user may be able to specify that they want to view the entity's associated Github marketplace. In addition, the user may be able to view a protection status of individual assets, which indicates whether the asset is "protected" or "unprotected." Examples of such visualizations are shown in FIGS. 5-8.

Figure 3A:
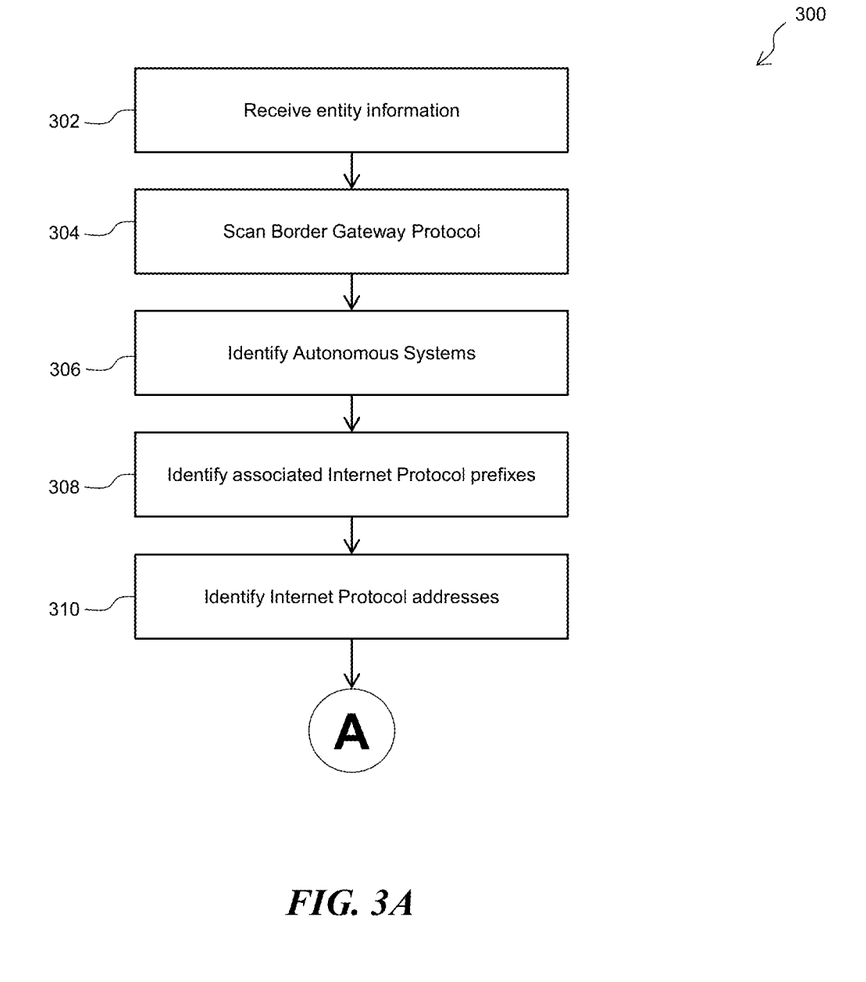
FIGS. 3A and 3B show an example process for generating an attack surface that can be performed within the system of FIG. 1, according to some embodiments of the present disclosure.
Figure 3B:
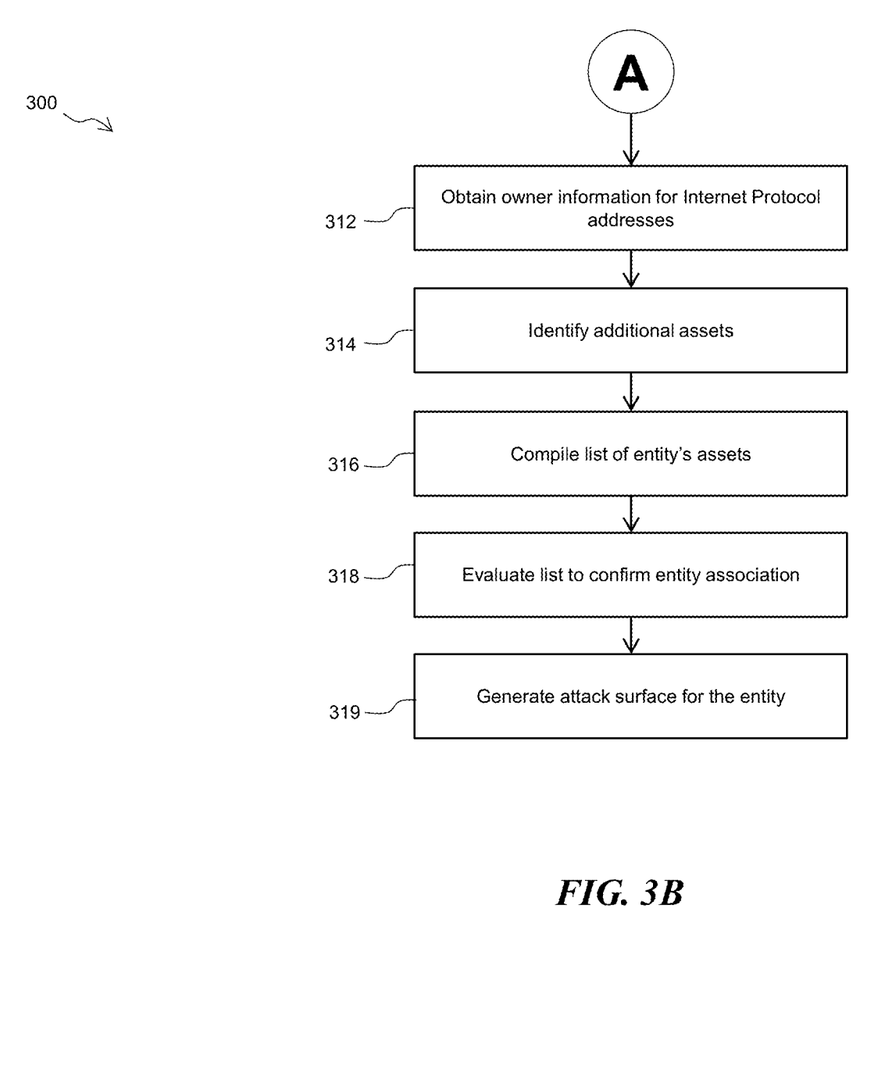

FIGS. 3A and 3B show an example process 300 for generating an attack surface that can be performed within the system of FIG. 1, according to some embodiments of the present disclosure. For example, process 300 may be performed by server 206 and its various modules on behalf of a cybersecurity company or platform that is monitoring and protecting an entity or organization. The entity/organization may connect with the cybersecurity service via one or more client devices 202, such as via the Internet or via a specifically defined user portal. Process 300 may also be performed in a grander scheme of protection. For example, after an entity's attack surface has been generated (i.e., after process 300 has been completed), the attack surface can be utilized by other segments of the cybersecurity service to offer monitoring and protection. It is important to note that, in some embodiments, various blocks of process 300 may be performed out of order or may be omitted.

At block 302, server 206 receives entity information associated with the protected entity or organization. Entity information can include various identifying information, such as address and location information, the name of the entity, name of the brand or product, main domain information, employee lists, or any other identifying information from the entity's customer-facing domain. In some embodiments, the information may be received directly from one or more client devices 202. In some embodiments, some or all of the information may be received from a cybersecurity analyst via an analyst device 222.

At block 304, BGP scanning module 208 scans the border gateway protocol (e.g., BGP routers for various AS's 101 of FIG. 1) to search for ASN prefixes associated with the protected entity's name or title. In some embodiments, the BGP search may be performed via various tools such as Hurricane Electric BGP Toolkit and/or other BGP searching tools. This searching will typically produce various search results that include ASN's and netblocks (ranges of IP addresses). In some embodiments, scanning can include scanning Search Engines (Google), ASNs, IPv4 Prefixes, ARIN data, Passive DNS DB (Farsight). At block 306, BGP scanning module 208 identifies autonomous systems (AS's) from the search results that also include related announced prefixes. For example, some AS's may not have any related prefixes.

At block 308, IP analysis module 210 identifies associated Internet Protocol prefixes. In other words, IP analysis module 210 identifies IP prefixes associated with the protected entity. For example, this may include identifying the announced prefixes that appear for each ASN in the BGP search performed at block 304. In some embodiments, prefixes may be either IPv4 or IPv6 prefixes, which publicly informs who the owner is along with a description. At block 310, IP analysis module 210 identifies IP addresses associated with the protected entity. In some embodiments, IP analysis module 210 can further view the actual prefixes to obtain information on the classless inter-domain routing (CIDR) blocks/ranges. This can be performed because, in some embodiments, there may be CIDR blocks/ranges that are not announced as prefixes or listed under particular ASN's. For example, in the case that an IPv6 subnet 2001:978:9900::/48 is listed under a particular ASN, IP analysis module 210 can run the IP through ipinfo.io to see if it's related to the protected entity. After removing the CIDR, the IPv6 may resolve to a particular website, such as the protected entity's primary domain. Then, once the IP address is verified, the CIDR block can be recorded as being associated with the protected entity.

At block 312, owner analysis module 212 obtains owner information for the various identified IP addresses that are associated with the protected entity. In some embodiments, the owner of the IP addresses will just be the same as the name of the protected entity, or variations thereof. At block 314, owner analysis module 212 identifies additional assets associated with the owner and/or the protected entity. In some embodiments, owner analysis module 212 can perform an Arin (American Registry for Internet Numbers) Whois Query, such as a wildcard search on the name (or other piece of identifying information) of the protected entity. Such a query can show customers, networks, and groups that contain the identifying information. In some embodiments, identifying additional assets associated with the protected entity can include searching for related domains. In some embodiments, this can be performed by domain discovery module 224. Domain discovery module 224 can perform various lookups, such as a Domain Name System (DNS) lookup. A DNS lookup can include finding all domain name records that result from a search of a CIDR block identified as being related to the protected entity. In some embodiments, this may only be used for IPv4 CIDR blocks. All identified domains can be identified as additional assets. In some embodiments, domain discovery module 224 can further identify subdomains associated with the protected entity. For example, domain discovery module 224 can pivot the identified domains with Farsight or some other similar database or open source search functionality, such as DNS dumpster. The initial pivot based on a domain can provide a list of results that include both subdomains and IP addresses. These subdomains and IP addresses can be identified as additional assets associated with the protected entity. If a search result is a domain, then domain discovery module 224 can perform additional pivots on those domains. In some embodiments, identifying additional assets can include identifying personnel-based assets associated with the entity. Additional details with respect to the identification of personnel-based assets are describe in relation to FIG. 4.

At block 316, attack surface maintenance module 216 maintains and compiles a list of assets identified as being associated with the protected entity. In some embodiments, the list compilation may be performed periodically throughout process 300. In some embodiments, the list can include identified cyberblocks, IP addresses/prefixes, domains, and subdomains. At block 318, asset evaluation module 214 can evaluate each asset of the compiled list to confirm relation to the protected entity. In some embodiments, this can include resolving or visiting the domains, determining a name or title associated with the domain, and comparing it to the name or other identifying information for the protected entity. At block 319, attack surface maintenance module 216 generates the attack surface for the entity. The attack surface includes all identified assets that have been evaluated and confirmed to be associated with the protected entity.

Figure 4:
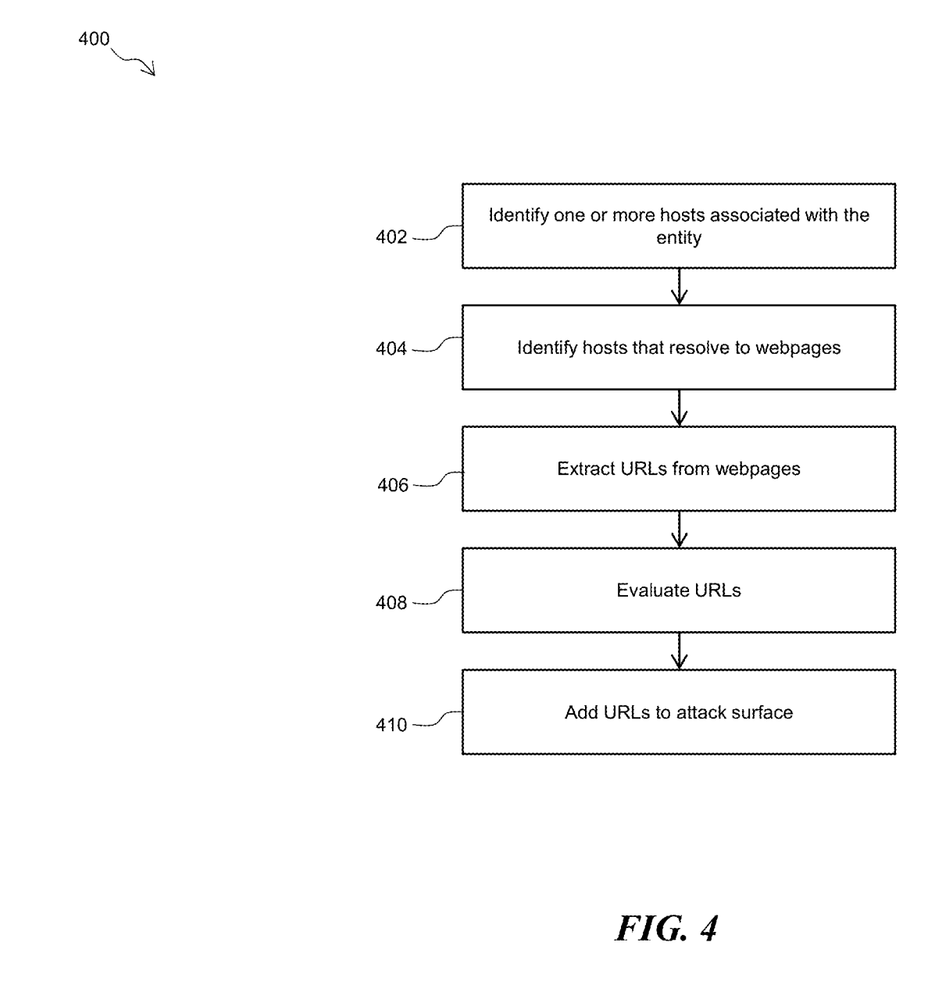
FIG. 4 is an example process for identifying personnel-based assets, according to some embodiments of the present disclosure.

FIG. 4 is an example process 400 for identifying personnel-based assets, according to some embodiments of the present disclosure. In some embodiments, a personnel-based asset may also be referred to as a digital asset. In some embodiments, process 400 can be performed as an independent process. In other embodiments, process 400 can be performed within process 300 of FIGS. 3A-3B, such as at block 314 when identifying additional assets associated with a protected entity.

At block 402, domain discovery module 224 identifies one or more hosts (or IP addresses) associated with a protected entity, such as the protected entity of process 300. At block 404, domain discovery module 224 can attempt to resolve the one or more hosts, identifying the hosts that resolve to webpages on the Internet. At block 406, if a host resolves to a webpage, crawling module 218 can identify and extract uniform resource locators (URLs) from the webpage. In some embodiments, the URL extraction can be performed by various web crawling or spider tools. In some embodiments, the URLs can be extracted by scraping the resolved webpage.

At block 408, asset evaluation module 214 evaluates the URLs to determine if the URLs are relevant and associated with the protected entity. In some embodiments, asset evaluation module 214 can utilize a regular expression to determine relevant and irrelevant URLs. For example, specific websites, such as Facebook, Twitter, LinkedIn, GitHub, and other social media sites, can be determined to be relevant. In addition, asset evaluation module 214 can, in the case of the specific website resolving to a person's Facebook account, identify whether the person is associated with the protected entity, such as by comparing the person's name to an employee list.

At block 410, attack surface maintenance module 216 adds the URLs and the associated accounts or other entity to the attack surface. The assets can include various entities associated with the protected entity, such as a person, a building (e.g., a science lab associated with a university may have its own Facebook page), a web address (e.g., a personal website of an employee), a GitHub account, a mobile application, a subsidiary company, etc.

Figure 5:
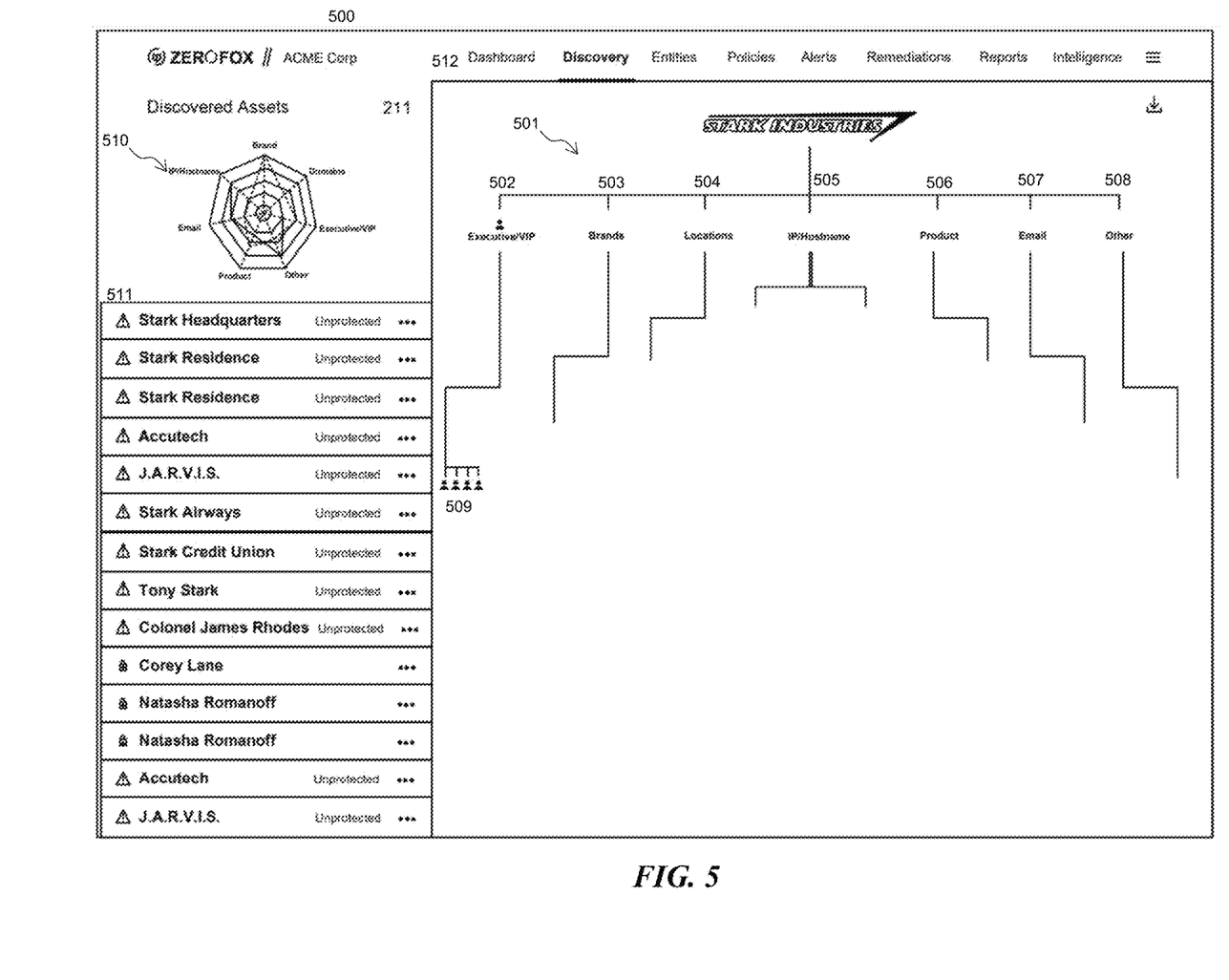
FIG. 5 is an example user interface showing an entity's discovered assets, according to some embodiments of the present disclosure.

FIG. 5 is an example user interface 500 showing an entity's discovered assets, according to some embodiments of the present disclosure. In some embodiments, the user interface 500 can be displayed at a client device 202 or an analyst device 222. The user interface 500 is part of a platform for the Stark Industries entity. The user interface 500 includes a visualization 501 of Stark Industries' attack surface. In some embodiments, as is shown in FIG. 5, the visualization 501 can take the form of a tree structure, although this is not limiting and other possible formats could be used. Visualization 501 includes asset classes 502-508, such as Executive/VIP assets 502, Brand assets 503, Location assets 504, IP/Hostname assets 505, Product assets 506, Email assets 507, and Other assets 508. In some embodiments, a user has the option to download the visualization 501. The assets included in user interface 500 can have been identified via methods 300 and 400. In some embodiments, asset classes include "roots" or "nodes" that display individual assets within the asset class, such as roots 509 within the Executive/VIP asset class 502. In this example, the roots 509 can include individuals associated with the entity (Stark Industries). In some embodiments, user interface 500 can also include an asset breakdown diagram 510, which visualizes how many of the 211 discovered assets fall within each of the asset classes. Additionally, the user interface 500 can include a list 511 of individual assets associated with Stark Industries, such as Stark Headquarters, Accutech, Tony Stark, J.A.R.V.I.S., etc. Some assets can include a status (e.g., unprotected).

Figure 6:
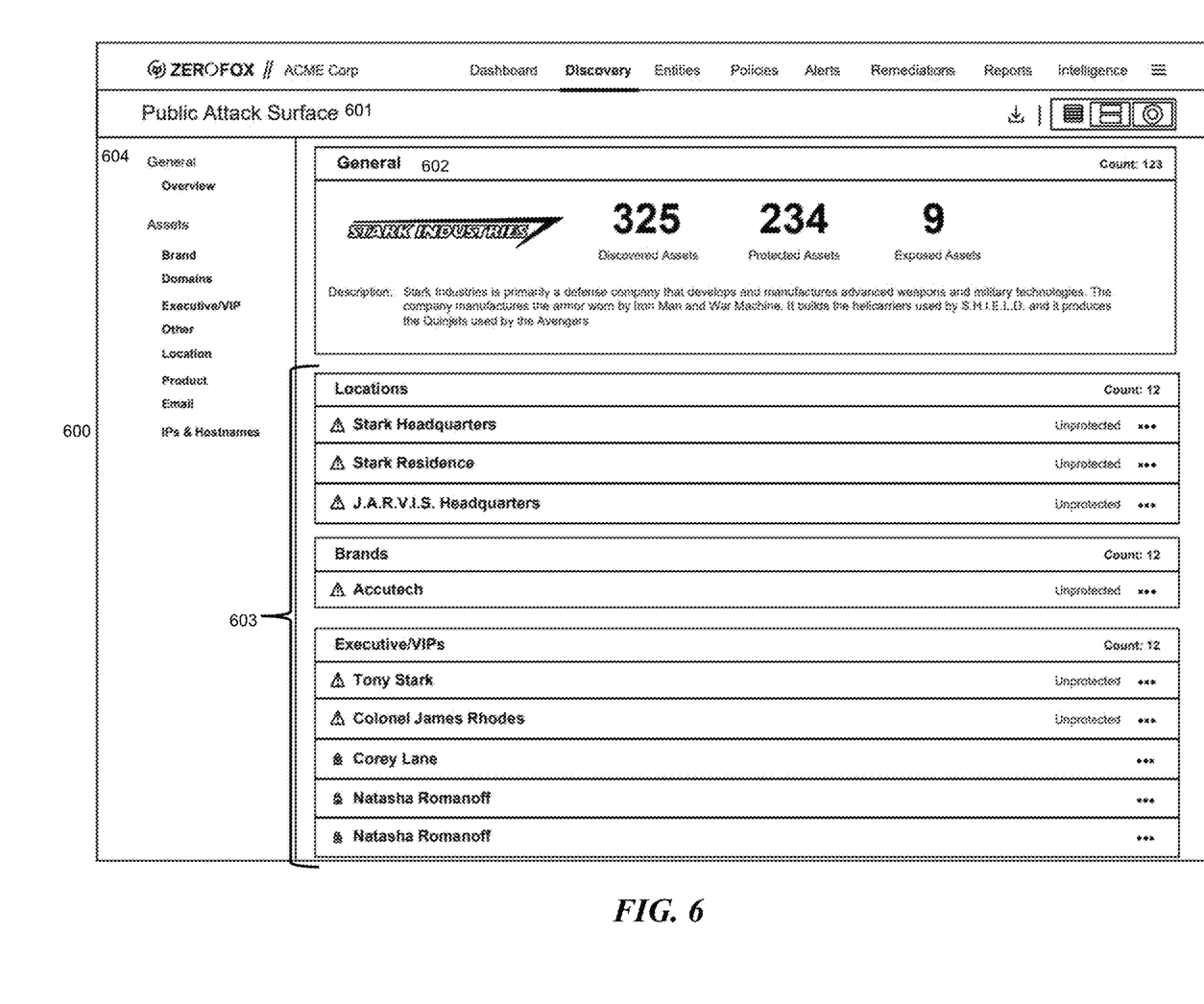
FIG. 6 is an example user interface showing a public attack surface for an entity, according to some embodiments of the present disclosure.

FIG. 6 is an example user interface 600 showing a public attack surface 601 for an entity, according to some embodiments of the present disclosure. In some embodiments, the user interface 600 can be displayed at a client device 202 or an analyst device 222. The user interface 600 is part of a platform for the Stark Industries entity. The user interface 600 includes a region 602 that describes the entity (i.e., Stark Industries) for which the public attack surface 601 is created. The region 602 can include a numerical summary of the public attack surface 601, such as the number of discovered assets (325), the number of protected assets (234), and the number of exposed assets (9), as well as a description of the entity. In addition, the user interface 600 includes a list 603 of assets, which can be segmented by asset class. For example, the Location asset class includes Stark Headquarters, Stark Residence, and J.A.R.V.I.S. Headquarters. Additionally, some or all of the assets can include a status (e.g., unprotected). Finally, the user interface 600 can include a table of contents 604, which allows the user to select an overview (which is shown at user interface 600) and individual asset classes.

Figure 7:
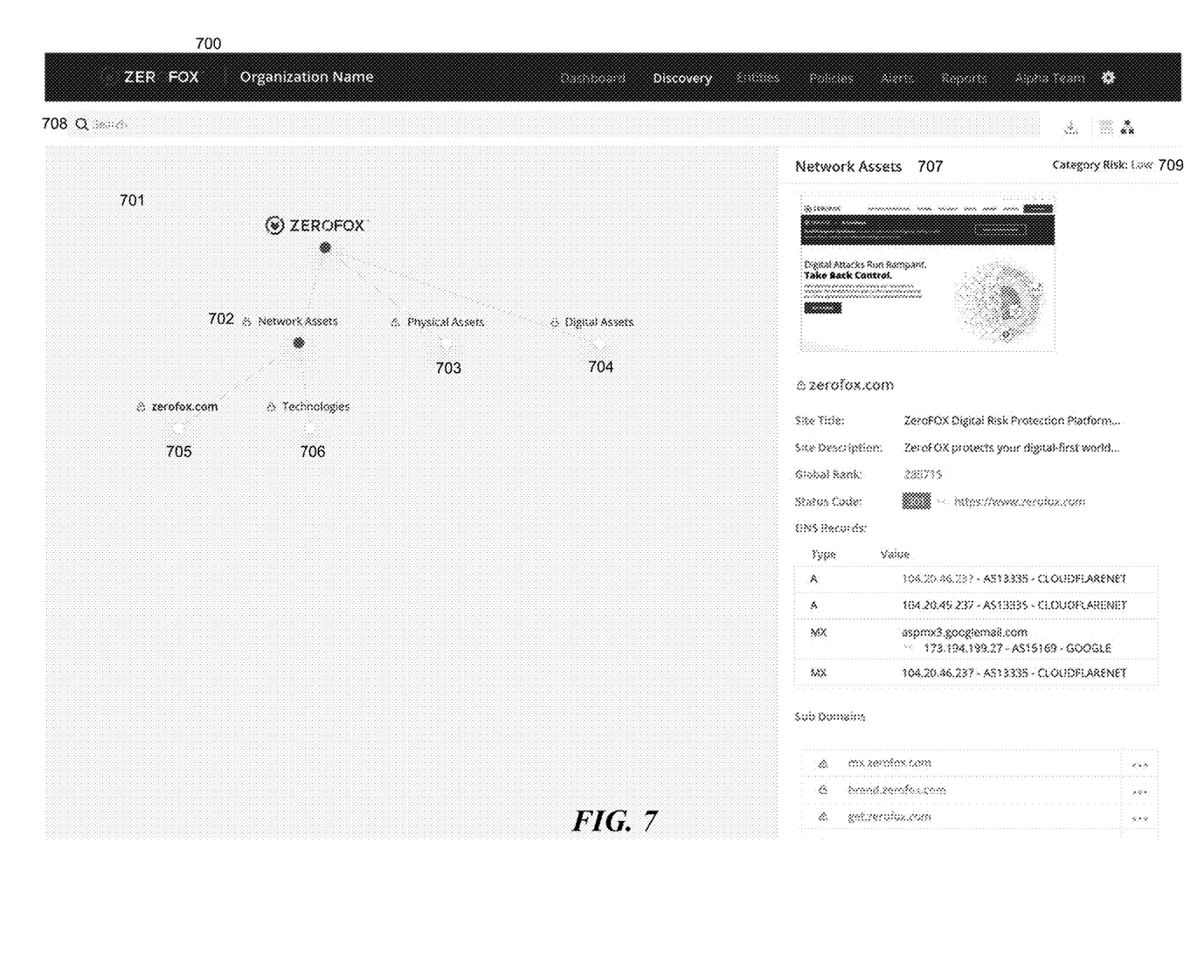
FIG. 7 is an example user interface showing a visualization of assets for an entity, according to some embodiments of the present disclosure.

FIG. 7 is an example user interface 700 showing a visualization 701 of assets for an entity, according to some embodiments of the present disclosure. In some embodiments, the user interface 700 can be displayed at a client device 202 or an analyst device 222. The visualization 701 includes a network-like structure (although is not limited to such a structure), which shows that an entity (ZeroFOX) has network assets 702, physical assets 703, and digital assets 704. Additionally, network assets 702 includes nodes for individual assets, such as node 705 for zerofox.com and a node 706 for Technologies (another class of assets). The nodes can be clickable/selectable by a user. For example, the user can select the network assets 702, which causes region 707 to be displayed. The region 707 provides various information on the network assets of ZeroFOX, such as a site title, site description, global rank, status code, DNS records, and associated sub-domains. The region 707 also includes a category risk indicator 709 for the network category of assets (e.g., low). The user interface 700 also includes a search bar 708, which allows users to search among the discovered assets.

Figure 8:
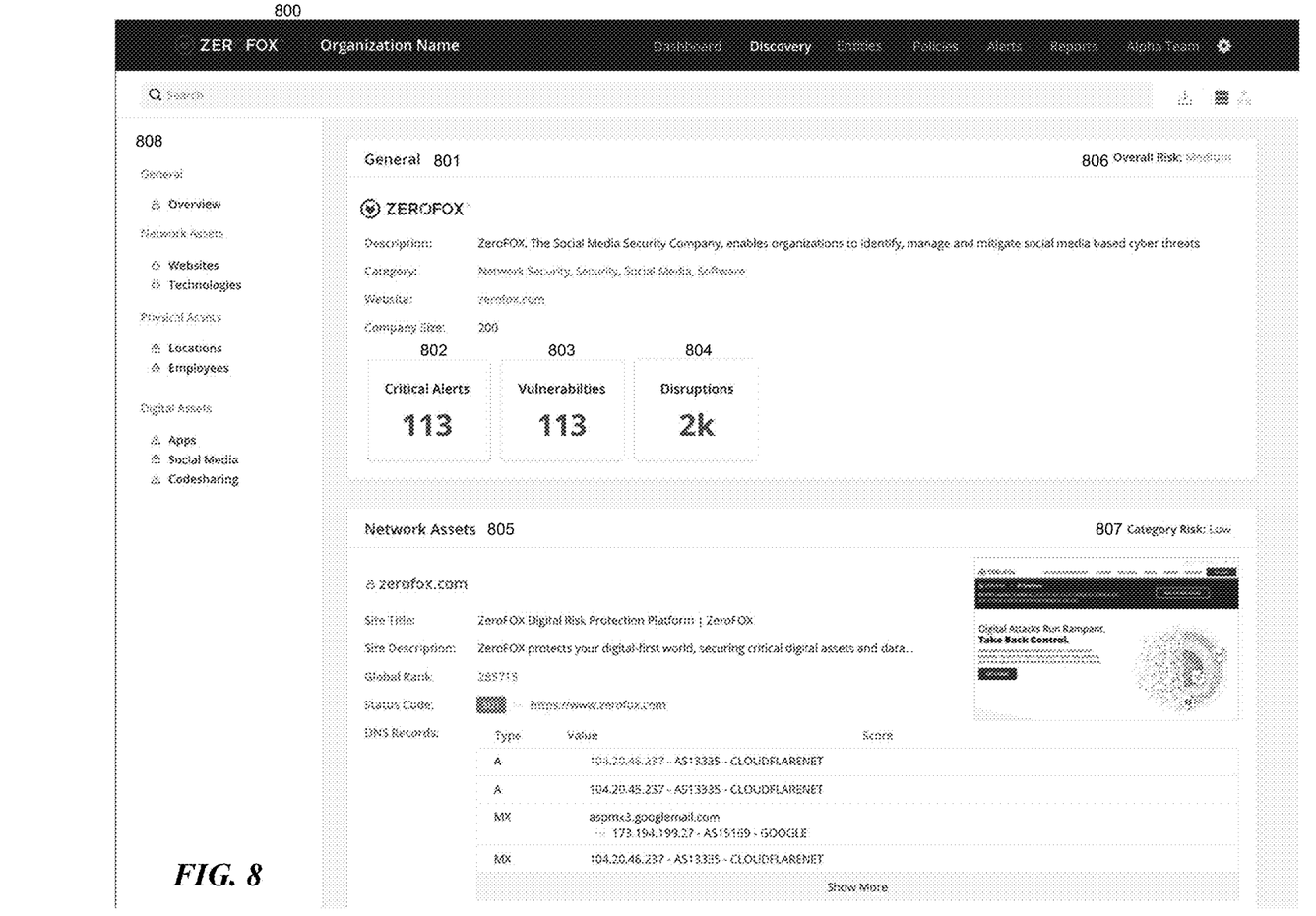
FIG. 8 is an example user interface showing network assets for an entity, according to some embodiments of the present disclosure.

FIG. 8 is an example user interface 800 showing network assets for an entity, according to some embodiments of the present disclosure. In some embodiments, the user interface 500 can be displayed at a client device 202 or an analyst device 222. The user interface 800 a region 801, which provides various general information about the entity, ZeroFOX. For example, the region 801 includes a number of critical alerts 802 (113), a number of vulnerabilities 803 (113), and a number of disruptions 804 (2,000). Other information describing the entity is possible. In addition, the region 801 includes an overall risk level 806 associated with the entity (i.e., "medium"). The user interface 800 can also include a region 805 that provides various information on the network assets of ZeroFOX, such as a site title, site description, global rank, status code, DNS records, etc. In addition, the region 805 includes a category risk indicator 807 for the network category of assets (e.g., low). Finally, the user interface 800 can include a table of contents 808, which allows the user to select an overview, individual asset classes, and individual segments within each type of asset.

Figure 9:
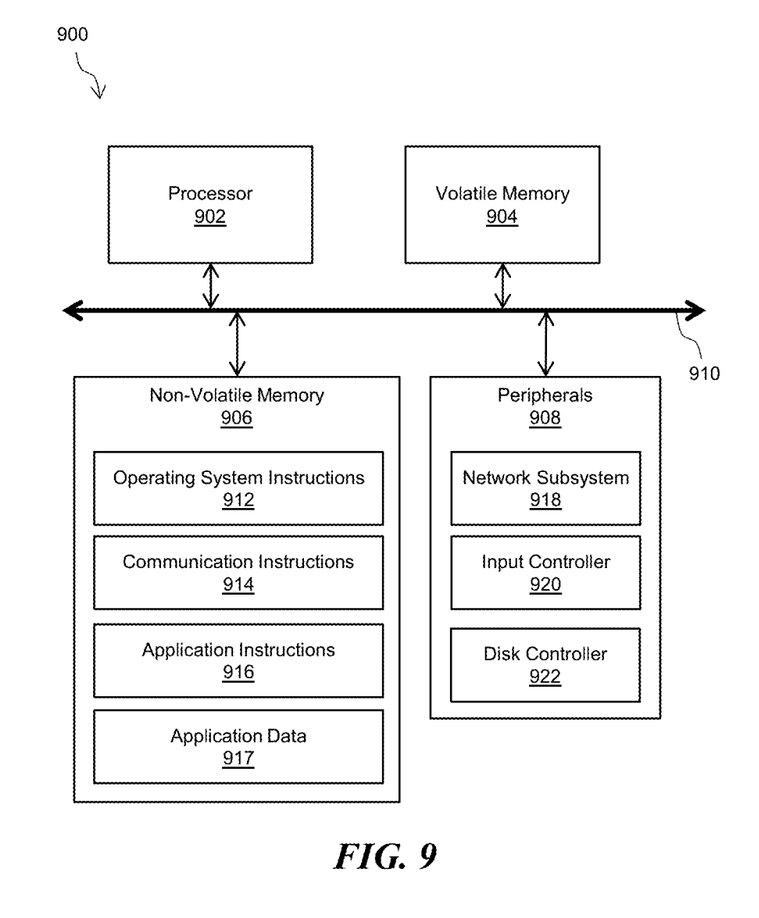
FIG. 9 is an example server device that can be used within the system of FIG. 1 according to an embodiment of the present disclosure.

FIG. 9 is a diagram of an example server device 900 that can be used within system 200 of FIG. 2. Server device 900 can implement various features and processes as described herein. Server device 900 can be implemented on any electronic device that runs software applications derived from complied instructions, including without limitation personal computers, servers, smart phones, media players, electronic tablets, game consoles, email devices, etc. In some implementations, server device 900 can include one or more processors 902, volatile memory 904, non-volatile memory 906, and one or more peripherals 908. These components can be interconnected by one or more computer buses 910.

Processor(s) 902 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 910 can be any known internal or external bus technology, including but not limited to ISA, EISA, PCI, PCI Express, USB, Serial ATA, or FireWire. Volatile memory 904 can include, for example, SDRAM. Processor 902 can receive instructions and data from a read-only memory or a random access memory or both. Essential elements of a computer can include a processor for executing instructions and one or more memories for storing instructions and data.

Non-volatile memory 906 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 906 can store various computer instructions including operating system instructions 912, communication instructions 914, application instructions 916, and application data 917. Operating system instructions 912 can include instructions for implementing an operating system (e.g., Mac OS®, Windows®, or Linux). The operating system can be multi-user, multiprocessing, multitasking, multithreading, real-time, and the like. Communication instructions 914 can include network communications instructions, for example, software for implementing communication protocols, such as TCP/IP, HTTP, Ethernet, telephony, etc. Application instructions 916 can include instructions for various applications. Application data 917 can include data corresponding to the applications.

Peripherals 908 can be included within server device 900 or operatively coupled to communicate with server device 900. Peripherals 908 can include, for example, network subsystem 918, input controller 920, and disk controller 922. Network subsystem 918 can include, for example, an Ethernet of WiFi adapter. Input controller 920 can be any known input device technology, including but not limited to a keyboard (including a virtual keyboard), mouse, track ball, and touch-sensitive pad or display. Disk controller 922 can include one or more mass storage devices for storing data files; such devices include magnetic disks, such as internal hard disks and removable disks; magneto-optical disks; and optical disks.

Figure 10:
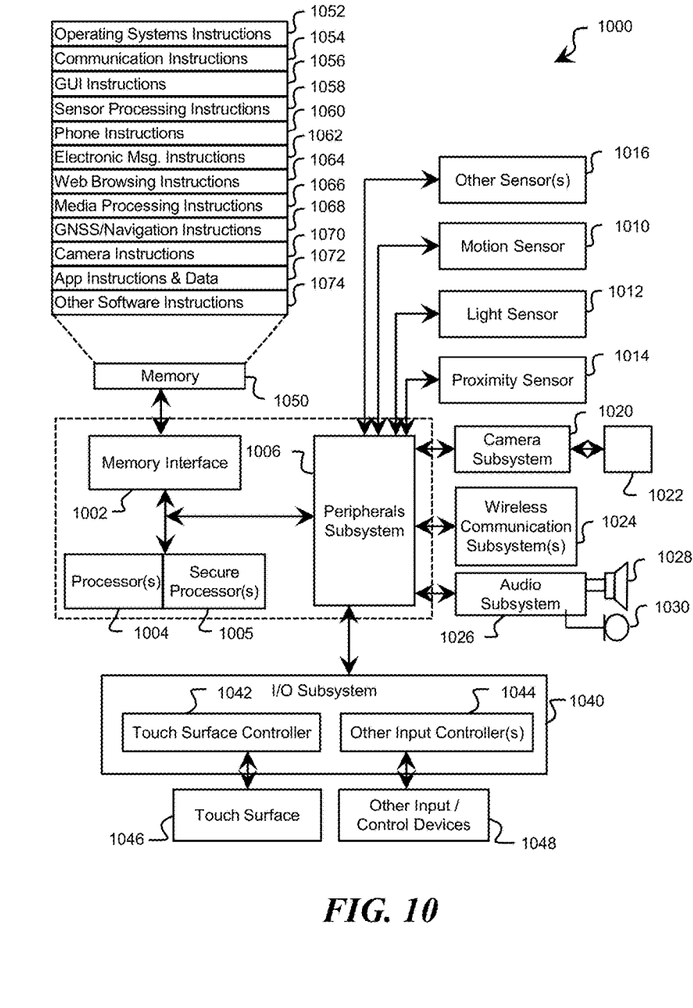
FIG. 10 is an example computing device that can be used within the system of FIG. 1 according to an embodiment of the present disclosure.

FIG. 10 is an example computing device that can be used within the system 200 of FIG. 2, according to an embodiment of the present disclosure. In some embodiments, device 1000 can be a client device 202 and/or an analyst device 222. The illustrative user device 1000 can include a memory interface 1002, one or more data processors, image processors, central processing units 1004, and/or secure processing units 1005, and peripherals subsystem 1006. Memory interface 1002, one or more central processing units 1004 and/or secure processing units 1005, and/or peripherals subsystem 1006 can be separate components or can be integrated in one or more integrated circuits. The various components in user device 1000 can be coupled by one or more communication buses or signal lines.

Sensors, devices, and subsystems can be coupled to peripherals subsystem 1006 to facilitate multiple functionalities. For example, motion sensor 1010, light sensor 1012, and proximity sensor 1014 can be coupled to peripherals subsystem 1006 to facilitate orientation, lighting, and proximity functions. Other sensors 1016 can also be connected to peripherals subsystem 1006, such as a global navigation satellite system (GNSS) (e.g., GPS receiver), a temperature sensor, a biometric sensor, magnetometer, or other sensing device, to facilitate related functionalities.

Camera subsystem 1020 and optical sensor 1022, e.g., a charged coupled device (CCD) or a complementary metal-oxide semiconductor (CMOS) optical sensor, can be utilized to facilitate camera functions, such as recording photographs and video clips. Camera subsystem 1020 and optical sensor 1022 can be used to collect images of a user to be used during authentication of a user, e.g., by performing facial recognition analysis.

Communication functions can be facilitated through one or more wired and/or wireless communication subsystems 1024, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 1024. The specific design and implementation of communication subsystems 1024 can depend on the communication network(s) over which the user device 1000 is intended to operate. For example, user device 1000 can include communication subsystems 1024 designed to operate over a GSM network, a GPRS network, an EDGE network, a WiFi or WiMax network, and a Bluetooth™ network. For example, wireless communication subsystems 1024 can include hosting protocols such that device 1000 can be configured as a base station for other wireless devices and/or to provide a WiFi service.

Audio subsystem 1026 can be coupled to speaker 1028 and microphone 1030 to facilitate voice-enabled functions, such as speaker recognition, voice replication, digital recording, and telephony functions. Audio subsystem 1026 can be configured to facilitate processing voice commands, voice-printing, and voice authentication, for example.

I/O subsystem 1040 can include a touch-surface controller 1042 and/or other input controller(s) 1044. Touch-surface controller 1042 can be coupled to a touch-surface 1046. Touch-surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In some implementations, a pressing of the button for a first duration can disengage a lock of touch-surface 1046; and a pressing of the button for a second duration that is longer than the first duration can turn power to user device 1000 on or off. Pressing the button for a third duration can activate a voice control, or voice command, module that enables the user to speak commands into microphone 1030 to cause the device to execute the spoken command. The user can customize a functionality of one or more of the buttons. Touch-surface 1046 can, for example, also be used to implement virtual or soft buttons and/or a keyboard.

In some implementations, user device 1000 can present recorded audio and/or video files, such as MP3, AAC, and MPEG files. In some implementations, user device 1000 can include the functionality of an MP3 player, such as an iPod™. User device 1000 can, therefore, include a 36-pin connector and/or 8-pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store an operating system 1052, such as Darwin, RTXC, LINUX, UNIX, OS X, Windows, or an embedded operating system such as VxWorks.

Operating system 1052 can include instructions for handling basic system services and for performing hardware dependent tasks. In some implementations, operating system 1052 can be a kernel (e.g., UNIX kernel). In some implementations, operating system 1052 can include instructions for performing voice authentication.

Memory 1050 can also store communication instructions 1054 to facilitate communicating with one or more additional devices, one or more computers and/or one or more servers. Memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic messaging-related process and functions; web browsing instructions 1064 to facilitate web browsing-related processes and functions; media processing instructions 1066 to facilitate media processing-related functions and processes; GNSS/Navigation instructions 1068 to facilitate GNSS and navigation-related processes and instructions; and/or camera instructions 1070 to facilitate camera-related processes and functions.

Memory 1050 can store application (or "app") instructions and data 1072, such as instructions for the apps described above in the context of FIGS. 2-4 and for modules 208-224. Memory 1050 can also store other software instructions 1074 for various other software applications in place on device 1000.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s)

how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for generating an attack surface for a protected entity comprising:
   receiving identifying information associated with the protected entity;
   scanning one or more third parties to identify a host associated with the protected entity;
   determining that the host resolves to a webpage;
   resolving the webpage;
   extracting a uniform resource locator (URL) from the resolved webpage;
   determining, based on at least one rule, that the URL is associated with the protected entity;
   generating the attack surface for the protected entity, the attack surface comprising the URL; and
   maintaining the generated attack surface on a storage medium; and
   monitoring the maintained attack surface to protect the protected entity.

2. The method of claim 1, wherein extracting the URL comprises crawling the resolved webpage.

3. The method of claim 1, wherein extracting the URL comprises scraping the resolved webpage.

4. The method of claim 1 comprising:
   determining that a social media account from the URL is associated with the protected entity; and
   modifying the attack surface for the protected entity to include the social media account.

5. The method of claim 1, wherein determining, based on the at least one rule, that the URL is associated with the protected entity comprises determining that the URL is associated with GitHub.

6. A non-transitory computer-readable medium having instructions stored thereon for execution by a server to implement a method for generating an attack surface for a protected entity, the method comprising the steps of:
   receiving identifying information associated with the protected entity;
   scanning one or more third parties to identify a host associated with the protected entity;
   determining that the host resolves to a webpage;
   resolving the webpage;
   extracting a uniform resource locators (URLs) from the resolved webpage;
   determining, based on at least one rule, that the URL is associated with the protected entity; and
   generating the attack surface for the protected entity, the attack surface comprising the URL; and
   maintaining the generated attack surface on a storage medium; and
   monitoring the maintained attack surface to protect the protected entity.

7. The non-transitory computer-readable medium of claim 6, wherein extracting the URL comprises crawling the resolved webpage.

8. The non-transitory computer-readable medium of claim 6, wherein extracting the URL comprises scraping the resolved webpage.

9. The non-transitory computer-readable medium of claim 6, wherein the method further comprises:
   determining that a social media account from the URL is associated with the protected entity; and
   modifying the attack surface for the protected entity to include the social media account.

10. The non-transitory computer-readable medium of claim 6, wherein determining, based on the at least one rule, that the URL is associated with the protected entity comprises determining that the URL is associated with GitHub.

* * * * *